(12) United States Patent
Sin et al.

(10) Patent No.: US 7,603,232 B2
(45) Date of Patent: Oct. 13, 2009

(54) VEHICLE POSITION TRACKING SYSTEM VIA SATELLITE AND METHOD THEREOF

(75) Inventors: Cheon-Sik Sin, Daejon (KR); Seong-Pal Lee, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 340 days.

(21) Appl. No.: 11/636,320

(22) Filed: Dec. 8, 2006

(65) Prior Publication Data

US 2007/0150193 A1 Jun. 28, 2007

(30) Foreign Application Priority Data

Dec. 9, 2005 (KR) ........................ 10-2005-0121169
Jun. 12, 2006 (KR) ........................ 10-2006-0052560

(51) Int. Cl.
*G01C 21/00* (2006.01)
(52) U.S. Cl. .................. 701/213; 701/207; 342/357.07; 342/357.12
(58) Field of Classification Search .......... 701/207–215; 342/357.06, 357.07, 357.08, 357.09, 357.12, 342/357.13, 357.14, 357.15
See application file for complete search history.

(56) References Cited

U.S. PATENT DOCUMENTS 6,937,187 B2 * 8/2005 van Diggelen et al. . 342/357.12
7,155,340 B2 * 12/2006 Churan ........................ 701/213
7,372,400 B2 * 5/2008 Cohen et al. ........... 342/357.01
7,421,342 B2 * 9/2008 Churan ........................ 701/213

FOREIGN PATENT DOCUMENTS

| JP | 2000-032542 | 1/2000 |
| JP | 2000-268288 | 9/2000 |
| KR | 10-2005-0076513 A | 7/2005 |
| KR | 10-2005-0096222 A | 10/2005 |

* cited by examiner

*Primary Examiner*—Richard M. Camby
(74) *Attorney, Agent, or Firm*—Blakely, Sokoloff, Taylor & Zafman LLP

(57) ABSTRACT

A vehicle position information transmitter via satellite, a method thereof, a vehicle position tracking system using the same and a method thereof are provided. The transmitter transmits vehicle position information and vehicle ID to the vehicle position information management center through the vehicle position information relay satellite if a satellite network communication state is good as the result of comparing a satellite signal intensity with a mobile communication signal intensity, or transmits vehicle position information and vehicle ID to the vehicle position information management center through the terrestrial network if a terrestrial network communication state is good as the result of comparing a satellite signal intensity with a mobile communication signal intensity.

8 Claims, 5 Drawing Sheets

VEHICLE POSITION TRACKING SYSTEM VIA SATELLITE AND METHOD THEREOF

FIELD OF THE INVENTION

The present invention relates to an apparatus for transmitting vehicle position information via satellite, a method thereof, a vehicle position tracking system using the same and a method thereof; and, more particularly, to a vehicle position tracking system and a method thereof for allowing a transmitter installed in a vehicle to transmit vehicle position information to a vehicle position information management center through a satellite network if the transmitter has difficulty to transmit vehicle position information to a vehicle position information management center through a terrestrial network based on a result of comparing a signal received from a base station belong to the terrestrial communication network and a signal received from a satellite belonging a satellite network, and for tracking a position and a traveling path of a target vehicle with reference to vehicle position information received through a satellite network from the transmitter in the vehicle and/or vehicle position information received through a terrestrial communication network from the transmitter.

DESCRIPTION OF RELATED ARTS

According to the development of a global positioning system (GPS) technology and a location based service (LBS) technology, services of providing a position of a person, an object, and a vehicle and a traveling path thereof become available. Such a service can be provided at anywhere and anytime that a user wants. Hereinafter, a conventional service of tracking a current potion of a target vehicle such as a stolen car will be described as follows.

A terminal with a GPS receive is mounted at a vehicle, and a vehicle position information management center cooperated with a mobile communication base station is built at a vehicle position tracking service provider.

At first, if an owner reports a car stolen to the vehicle position information management center through a web page managed thereby, the vehicle position information management center instructs the vehicle position information transmitter to upload current position information, for example, coordinate with longitude and latitude, through the mobile communication base station.

Accordingly, the vehicle position information transmitter mounted at the stolen vehicle transmits the current position information obtained from a GPS satellite to vehicle position information management center through a near mobile communication base station. As another example, the vehicle position information transmitter transmit current position information obtained from a GPS satellite according to preset setup to the vehicle position information management center through a mobile communication base station without receiving external instructions.

Then, the vehicle position information management center informs the owner of the current position information of the stolen vehicle received through the mobile communication base station, or inform the owner of the current moving path of the stolen vehicle, or providing the current moving path of the stolen vehicle to the relate system in a police station.

As described above, in the conventional technology related to the vehicle position tracking service, the vehicle position information transmitter transmits current position information to the vehicle position information management center only through a terrestrial network such as a base station posted adjacent areas where a mobile communication signal can reach.

However, if mobile communication base stations are not installed at a street where a vehicle is currently passing along, if a base station signal cannot reach to a street where a vehicle is passing along, if terrestrial network equipment becomes malfunctioned due to natural disaster such as heavy rain or heavy snowfall, and if a mobile communication system generates errors while communication with the vehicle position information transmitter, the vehicle position information management center cannot collect current position information of moving vehicle, and it happens frequently. Since a current position and a traveling path of a stolen car cannot accurately collected in real time, the stolen vehicle cannot be tracked accurately or it fails to track the stolen vehicle.

Therefore, there is a demand for developing a method of allowing a vehicle position information transmitter to transmit a current position information and a related vehicle ID to the vehicle position information management center in real time not only through mobile communication base stations but also through other communication path when the vehicle position information transmitter has a difficult to transmit the current position information and the related vehicle ID to the vehicle position information management center through the terrestrial network.

SUMMARY OF THE INVENTION

It is, therefore, an object of the present invention to provide a vehicle position tracking system and a method thereof for allowing a transmitter installed in a vehicle to transmit vehicle position information to a vehicle position information management center through a satellite network if the transmitter has a difficulty to transmit vehicle position information to a vehicle position information managing center through a terrestrial network based on a result of comparing a signal received from a base station belong to the terrestrial communication network and a signal received from a satellite belonging a satellite network, and for tracking a position and a traveling path of a target vehicle with reference to vehicle position information received through a satellite network from the transmitter in the vehicle and/or vehicle position information received through a terrestrial communication network from the transmitter.

In accordance with an aspect of the present invention, there is provided a vehicle position information transmitter via a satellite including: a satellite network signal transceiver for transmitting and receiving a satellite signal to/from a vehicle position information relay satellite through a satellite network antenna; a terrestrial network signal transceiver for transmitting and receiving a mobile communication signal to/from a base station through a terrestrial network antenna; a receiving signal comparator for comparing an intensity of the received satellite signal with an intensity of the received mobile communication signal; a communication network determiner for determining a signal transmission network based on the result of comparison the signal intensities from the receiving signal comparator; a communication link setup unit for establishing a satellite network link through the satellite network signal transceiver or a terrestrial network link through the terrestrial network signal transceiver according to the determined communication network from the communication network determiner; and a transmission signal generator for generating a signal to transmit through the setup communication link at the communication link setup unit, wherein vehicle position information and vehicle ID are transmitted through the satellite network if a satellite network communication state is good as the result of comparing the signal intensities, or vehicle position information and vehicle ID are transmitted through the terrestrial network if a terrestrial network communication state is good as the result of comparing the signal intensities.

In accordance with another aspect of the present invention, there is also provided a method of transmitting vehicle position information via a satellite network including the steps of: a) comparing an intensity of a satellite signal received from a vehicle position information relay satellite with an intensity of a mobile communication signal received from a near base station when receiving a vehicle position information upload instruction through a satellite network or a terrestrial network, or at a pre-set time period; and b) transmitting vehicle position information and vehicle ID to the vehicle position information relay satellite if the intensity of the satellite signal is greater than the intensity of the mobile communication signal, and transmitting vehicle position information and vehicle ID to the near base station if the intensity of the mobile communication signal is greater than the intensity of the satellite signal.

In accordance with still another aspect of the present invention, there is also provided a vehicle position tracking system include: a vehicle position information management center for transmitting a vehicle position information upload instruction to a vehicle position information transmitter through a satellite network and a terrestrial network, and providing a vehicle position tracking service to a corresponding subscriber based on vehicle position information and vehicle ID received from a vehicle position information transmitter through a satellite network and/or a terrestrial network; a mobile communication system of a terrestrial network for transmitting and receiving signals between the vehicle position information management center and the vehicle position information transmitter; a vehicle position information relay satellite of a satellite network for transmitting and receiving signals between the vehicle position information management center and the vehicle position information transmitter; a satellite network control station for transmitting and receiving a signal between the vehicle position information relay satellite and the vehicle position information management center; and a vehicle position information transmitter for transmitting vehicle position information and vehicle ID to the vehicle position information management center through the vehicle position information relay satellite if a satellite network communication state is good as the result of comparing a satellite signal intensity with a mobile communication signal intensity, or transmitting vehicle position information and vehicle ID to the vehicle position information management center through the terrestrial network if a terrestrial network communication state is good as the result of comparing a satellite signal intensity with a mobile communication signal intensity.

In accordance with further still another aspect of the present invention, there is provided a method of tracking a vehicle position including the steps of: a) inquiring vehicle information corresponding to a subscriber if a request of tracking a vehicle position from a subscriber through a predetermined terminal; b) creating a vehicle position information upload instruction to transmit to the inquired vehicle; c) transmitting the created vehicle position information upload instruction to the inquired vehicle through a satellite network and a terrestrial network; d) receiving vehicle position information and vehicle ID from a corresponding vehicle position information transmitter through a satellite network and/or a terrestrial network as a result of transmitting the vehicle position information upload instruction; and e) providing vehicle position tracking information to the subscriber based on the received vehicle position information.

BRIEF DESCRIPTION OF THE DRAWINGS

The above and other objects and features of the present invention will become better understood with regard to the following description of the preferred embodiments given in conjunction with the accompanying drawings, in which.

DETAILED DESCRIPTION OF THE INVENTION

Hereinafter, an apparatus for transmitting vehicle position information via satellite, a method thereof, a vehicle position tracking system using the same and a method thereof will be described in more detail with reference to the accompanying drawings.

Figure 1:
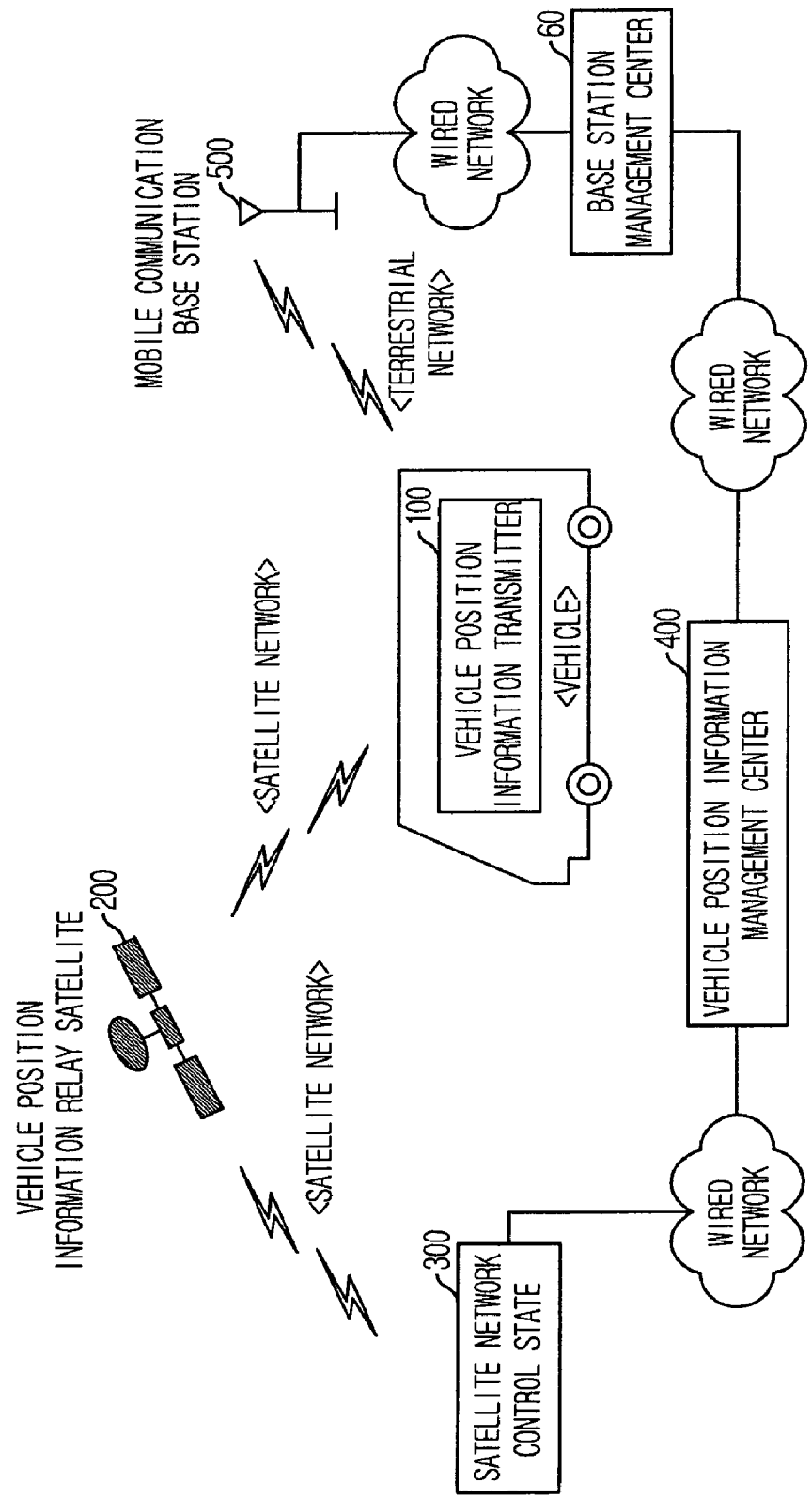
FIG. 1 is a diagram illustrating a vehicle position tracking system via a satellite network in accordance with an exemplary embodiment of the present invention.

FIG. 1 is a diagram illustrating a vehicle position tracking system via a satellite network in accordance with an exemplary embodiment of the present invention.

As shown in FIG. 1, the vehicle position tracking system according to the present embodiment includes a vehicle position information transmitter 100 installed in a vehicle, a vehicle position information relay satellite 200 floating through the air above the earth, a satellite network control station 300 for controlling the vehicle position information relay satellite 200, a vehicle position information management center 400 built by a vehicle position information server provider, a plurality of mobile communication base stations 500 posted along a street side, and a base station management center 600 of mobile carrier for managing the base stations 500.

In the present embodiment, the vehicle position information transmitter 100 disposed at a vehicle transmits position information such as coordinates of latitude and longitude, which are obtained from global positioning signal (GPS) satellites (not shown), and vehicle ID registered at itself, the vehicle position information transmitter, to the vehicle position information management center 400 not only through the base stations 500 belonging to a corresponding terrestrial network but also through the vehicle position information relay satellite 200 belonging to a related satellite network.

That is, the vehicle position information transmitter 100 according to the present embodiment compares the states of the signals from the terrestrial network and the satellite network, decides whether the vehicle position information and the vehicle ID is transmitted to the vehicle position information management center 400 through the base station 500 or through the vehicle position information relay satellite 200 according to a current condition of communicating environment, and transmits the vehicle position information obtained in real time to the vehicle position information management center 400 through the decided communication network to be proper to the current condition.

For example, if the vehicle position information transmitter 100 is located at an area not proper to communicate through a satellite network and proper to communication through a terrestrial network, i.e., an underpass or a tunnel with base stations installed, the vehicle position information transmitter 100 transmits a signal to outside through the base stations 500. If the vehicle position information transmitter 100 is located at an area proper to communicate through a satellite network and not proper to communicate through a terrestrial network, i.e., a street with malfunctioning base stations installed, the vehicle position information transmitter 100 transmits a signal to outside through the vehicle position information relay satellite 200.

In the vehicle position information tracking system according to the present embodiment, the vehicle position information management center 400 tracks a current position and a traveling path of a target vehicle such as stolen car in response to a request from an owner of the target vehicle with reference to vehicle position information received from the vehicle position information transmitter 100 through the vehicle position information relay satellite 200 and the satellite network control station 300 and/or vehicle position information received from the vehicle position information transmitter 100 through the base station 500 and the base station management center 600, and provides related vehicle position tracking information to the owner.

Hereinafter, the vehicle position information transmitter 100 according to the present embodiment will be described with reference to FIG. 2. Each of constitutional elements of the vehicle position information relay satellite 200 will be described with reference to FIG. 3. Each of constitutional elements of the satellite network control station 300 will be described with reference to FIG. 4. Each of constitutional elements of the vehicle position information management center 400 will be described with reference to FIG. 5. Meanwhile, the detailed description of well-known elements such as the base station 500 and the base station management center 600 will be omitted, and only related part of the well-known elements to the vehicle position tracking system will be described.

Figure 2:
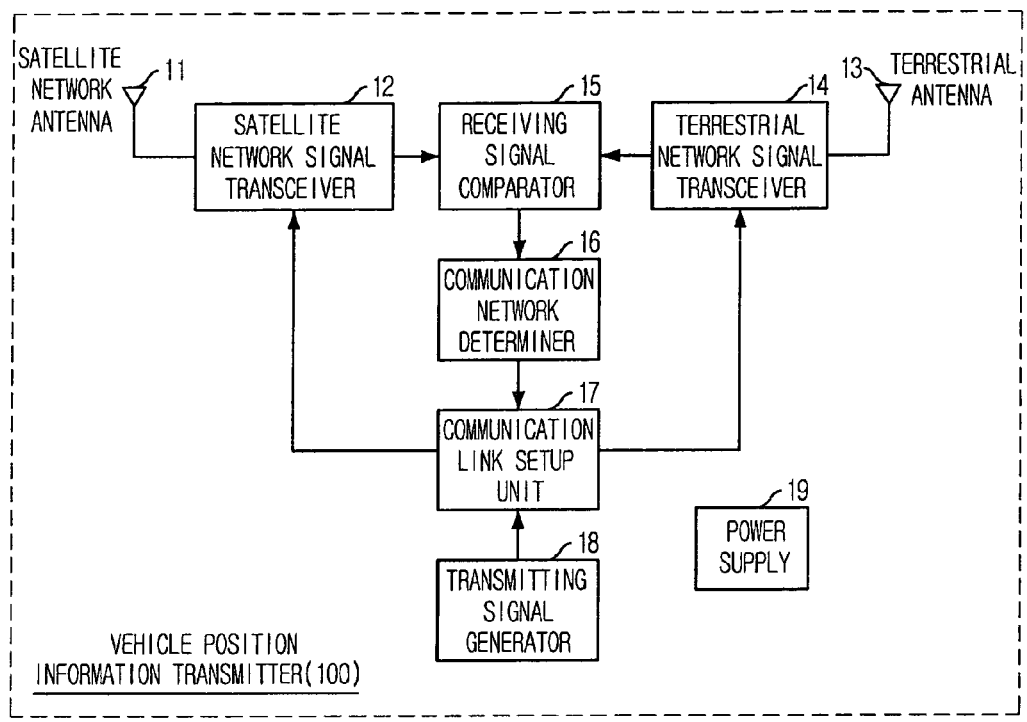
FIG. 2 is a block diagram illustrating a vehicle position information transmitter 100 shown in FIG. 1 in accordance with an embodiment of the present invention.

FIG. 2 is a block diagram illustrating a vehicle position information transmitter 100 shown in FIG. 1 in accordance with an embodiment of the present invention.

As described above with reference to FIG. 1, the vehicle position information transmitter 100 transmits position information obtained from a GPS satellite and a vehicle ID registered at a device, for example, the vehicle position information transmitter 100, to the vehicle position information management center 400 through the base stations 500 belonging to a terrestrial network, or through the vehicle position information relay satellite 200 belonging to a satellite network.

The vehicle position information transmitter 100 continuously compares and monitors the communication states in the terrestrial network and the satellite network, selects one having better condition between the terrestrial network and the satellite network, and transmits the position information and the vehicle ID through the selected network. That is, the vehicle position information transmitter 100 transmits the position information and the vehicle ID through the selected one of the base station 500 and the vehicle position information relay satellite 200.

For example, when the vehicle position information transmitter 100 receives an information upload instruction from the base station 500 or the vehicle position information relay satellite 200, which are related to the vehicle position information management center 400, the vehicle position information transmitter 100 selects a network having better communication network at a current vehicle position, and transmits the vehicle position information obtained in real time to the vehicle position information management center 400 through the selected network. As described above, the vehicle position information transmitter 100 performs a dual mode communication function, hereinafter a dual mode, which selects one of the terrestrial network and the satellite network to transmit the information.

In order to perform such an operation, the vehicle position information transmitter 100 includes a satellite network antenna 11, a satellite network signal transceiver 12, a terrestrial network antenna 13, a terrestrial network signal transceiver 14, a receiving signal comparator 15, a communication network determiner 16, a communication link setup unit 17, a transmitting signal generator 18, and a power supply 19. Hereinafter, each of the constitutional elements of the vehicle position information transmitter 100 will be described in detail.

The satellite network antenna 11 and the satellite network signal transceiver 12 transmits and receives various signals to the vehicle position information relay satellite 200, such as a vehicle position information upload instruction, vehicle position information, and vehicle ID. The satellite network antenna 11 and the satellite network signal transceiver 12 can receive the GPS signal from the GPS satellites as well as the signals from the vehicle position information relay satellite 200.

The terrestrial network antenna 13 and the terrestrial network signal transceiver 14 transmit and receive various signals to the base stations 500, for example, a vehicle position information upload instruction, vehicle position information, and vehicle ID. In addition, the terrestrial network antenna 13 and the terrestrial network signal transceiver 14 can receive well-known mobile communication signals such as voice and data related signals.

Especially, it is preferable that the satellite network antenna 11, the satellite network signal transceiver 12, the terrestrial network antenna 13, and the terrestrial signal transceiver 14 are always activated and driven according to a predetermined setup in order to wait for receiving a signal from the terrestrial network or the satellite network. For example, the predetermined setup may be to always transmit vehicle position information to the vehicle position information management center 400 according to a result of comparing signals from the terrestrial network and the satellite network without specialized instruction. For another example, the satellite network antenna 11, the satellite network signal transceiver 12, the terrestrial network antenna 13, and the terrestrial signal transceiver 14 may be activated and driven by vehicle position information upload instruction from an external device.

Meanwhile, it is obvious to those skilled in the art that the satellite network signal transceiver 12 and the terrestrial network signal transceiver 14 further include well-known constitutional elements such as a signal processor, a transmitting power amplifier, and a signal amplifier in order to transmit RF signal containing created information to the vehicle position information relay satellite 200 and the base station 500.

In addition, the satellite network antenna 11, the satellite signal transceiver 12, the terrestrial network antenna 13, and the terrestrial network signal transceiver 14 can be embodied as a chip with an antenna embedded and capable of processing dual frequency band signal.

The receiving signal comparator 15 compares the intensity or the level of a signal received from the vehicle position information relay satellite 200 through the satellite network antenna 11 and the satellite network signal transceiver 12 with that of a signal received from the base station 500 through the terrestrial network antenna 13 and the terrestrial network signal transceiver 14, and informs the communication network determiner 16 of the comparison result. The signal intensity comparison result may be a numeral value denoting 'satellite network signal intensity versus terrestrial network signal intensity'.

The communication network determiner 16 determines whether the communication state of the satellite network is better than that of the terrestrial network, whether the communication state of the terrestrial network is better than that of the satellite network, or whether the communication state of the terrestrial network is equal to that of the satellite network.

The communication network determiner 16 determines to transmit the vehicle position information and the vehicle ID through the satellite network if the communication state of the satellite network is better than that of the terrestrial network, for example, when a vehicle passes along an underpass or a tunnel with the base stations installed. On the contrary, the communication network determiner 16 determines to transmit the vehicle position information and the vehicle ID through the terrestrial network if the communication state of the terrestrial network is better than that of the satellite network, for example, when a vehicle passes on a street with malfunctioning base stations. Furthermore, the communication network determiner 16 determines to transmit the vehicle position information and the vehicle ID through a corresponding network according to the default setup if the communication state of the terrestrial network is equal to that of the satellite network, for example, when a vehicle passes on a wide opened street with base stations densely installed. For example, the default setup for transmitting the vehicle position information and the vehicle ID can be defined as using anyone of the terrestrial network and the satellite network. However, it is preferable to always sustain communication between the vehicle position information transmitter 100 and the base station 500. Therefore, it may be better to transmit the vehicle position information through the terrestrial network than through the satellite network when the communication state of the terrestrial network is equal to that of the satellite network.

The communication link setup unit 17 includes a satellite transmission link setup unit and a terrestrial transmission link setup unit. According to the signal transmission network, a communication path, decided at the communication network determiner 16, if the satellite network is decided, the satellite transmission link setup unit establishes a link to the satellite network by setting up a bandwidth and a channel, thereby transmitting the vehicle position information to the vehicle position information relay satellite 200. If the terrestrial network is decided, the terrestrial transmission link setup unit establishes a link to the terrestrial network by setting up a bandwidth and a channel, thereby transmitting the vehicle position information to the base station 500.

The transmission signal generator 18 creates corrected position information and vehicle ID based on position information obtained from the GPS satellite such as coordinates of latitude and longitude, particularly, based on the GPS signal correct information received from the vehicle position information management center 400 through the base station 500 or the vehicle position information relay satellite 200. The created signal from transmission signal generator 18 is transmitted to the outside after performing signal processing, transmission power amplification, and signal amplification in the RF module.

As described above, the vehicle position information transmitter 100 regularly transmits the vehicle position information obtained in real time selectively using one of the satellite network and the terrestrial network according to the communication state of the current location of the vehicle. For example, when a vehicle travels areas in an order of an area with good satellite communication state, an area with good terrestrial communication state, an area with good terrestrial communication state, and an area with good satellite communication state, the vehicle position information transmitter 100 of the vehicle transmits the vehicle position information through in an order of the satellite network, the terrestrial network, the terrestrial network, and the satellite network.

The power supply 19 supplies power to each of the constitutional elements 11 to 18. The power supply 19 may be embodied as an internal battery or a power adaptor for a vehicle.

The vehicle position information transmitter 100 can be mounted outside and/or inside the vehicle. Also, the parts for transmitting and receiving signals to/from the base station 500 and the vehicle position information relay satellite 200, such as an antenna, may be mounted on the roof of the vehicle, and parts influenced by external environment, such as the receiving signal comparator, may be mounted inside the vehicle.

Figure 3:
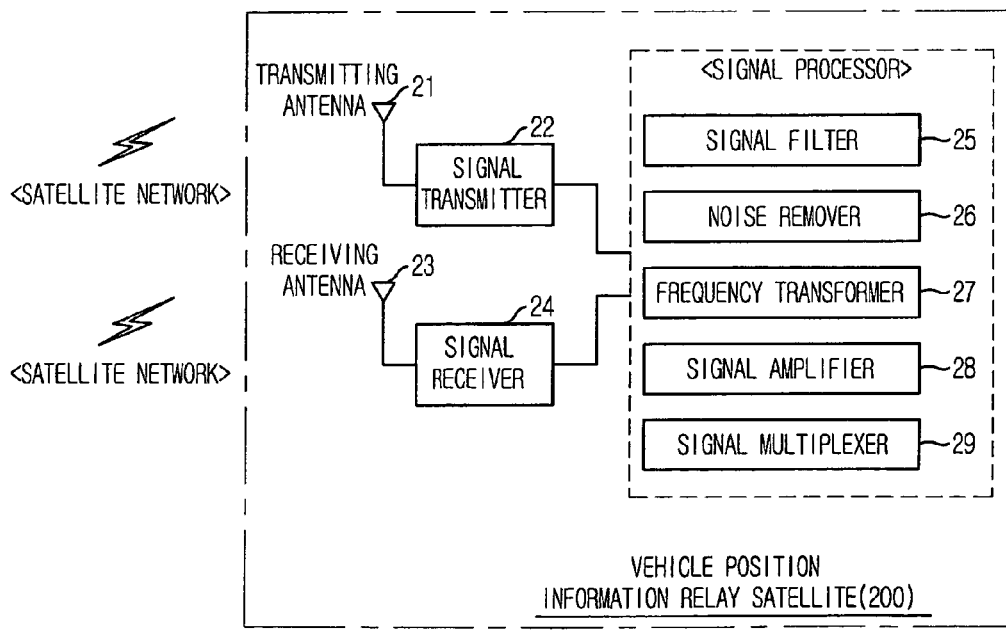
FIG. 3 is a block diagram illustrating a vehicle position information relay satellite 200 shown in FIG. 1 in accordance with an embodiment of the present invention.

FIG. 3 is a block diagram illustrating a vehicle position information relay satellite 200 shown in FIG. 1 in accordance with an embodiment of the present invention.

As described above with reference to FIG. 1, when the vehicle position information relay satellite 200 receives a vehicle position information upload instruction from the vehicle position information management center 400 through the satellite network control station 300, the vehicle position information relay satellite 200 transmits the vehicle position information upload instruction to the vehicle position information transmitter 100 through the satellite network. For example, the vehicle position information relay satellite 200 broadcasts the vehicle position information upload instruction to the ground. Then, the vehicle position information relay satellite 200 transmits vehicle position information and vehicle ID, which are received from the vehicle position information transmitter 100, to the vehicle position information management center 400 through the satellite network control station 300.

In addition, the vehicle position information relay satellite 200 floats in an air above the earth at a proper height to cover a vehicle position tracking service providing area. It is preferable that the vehicle position information relay satellite 200 is a geostationary orbit satellite.

Furthermore, the vehicle position information upload instruction from the vehicle position information management center 400 to the vehicle position information transmitter 100 may be transmitted to the vehicle position information transmitter 100 through the base station management center 600 and the base station 500.

In order to perform such an operation, the vehicle position information relay satellite 200 includes a transmission antenna 21, a signal transmitter 22, a receiving antenna 23, a signal receiver 24, a signal filter 25, a noise remover 25, a frequency transformer 27, a signal amplifier 28, and a signal multiplexer 29. Each of the constitutional elements of the vehicle position information relay satellite 200 will be described in detail hereinafter.

The transmitting antenna 21 and the signal transmitter 22 are used to transmit the vehicle position information upload instruction, which is received from the vehicle position information management center 400 through the satellite network control station 300, to the vehicle position information transmitter 100. Also, the transmitting antenna 21 and the signal transmitter 22 are used to transmit vehicle position information and vehicle ID of the vehicle position information transmitter 100 to the vehicle position information management center 400 through the satellite network control station 300.

The receiving antenna 23 and the signal receiver 24 are used to receive a vehicle position information upload instruction, which is received from the vehicle position information management center 400 through the satellite network control station 300, and used to receive vehicle position information and vehicle ID from the vehicle position information transmitter 100.

The vehicle position information relay satellite 200 relays a satellite signal carrying specific information between the vehicle position information management center 400 and the vehicle position information transmitter 100 through the satellite network control station 300. In order to process such a transmitting and receiving signal, a signal processor is included therein. The signal processor of the vehicle position information relay satellite 200 may include constitutional elements as follows. It is obvious to those skilled in the art that the constitutional elements can be modified, added or replaced with various satellite signal processing elements.

The signal filter 25 extracts information from a satellite by filtering the bandwidth of the satellite signal received from the vehicle position information management center 400 or the vehicle position information transmitter 100.

The noise remover 26 removes noise signal included in a satellite signal received from the vehicle position information management center 400 or the vehicle position information transmitter 100, for example, the noise generated from the satellite link.

The frequency transformer 27 transforms the frequency band of a satellite signal to be proper to a corresponding frequency band to transmit a satellite signal to the vehicle position information management center 400 or the vehicle position information transmitter 100.

The signal amplifier 28 amplifies the transmitting power of a satellite signal to reach to the vehicle position information management center 400 or the vehicle position information transmitter 100. Such a signal amplifier 28 performs a channel amplification function and a high power amplification function. Herein, the channel amplification function amplifies a satellite signal by providing a gain of a satellite formed on each channel unit. The high power amplification function provides a sufficient power to transmit the satellite signal to the satellite network control station 300 or the vehicle position information transmitter 100 by being driven in a linear area on a satellite signal.

The signal multiplexer 29 multiplexes a satellite signal formed of a plurality of channels to one satellite signal in order to transmit a satellite signal to the vehicle position information management center 400 or the vehicle position information transmitter 100.

Figure 4:
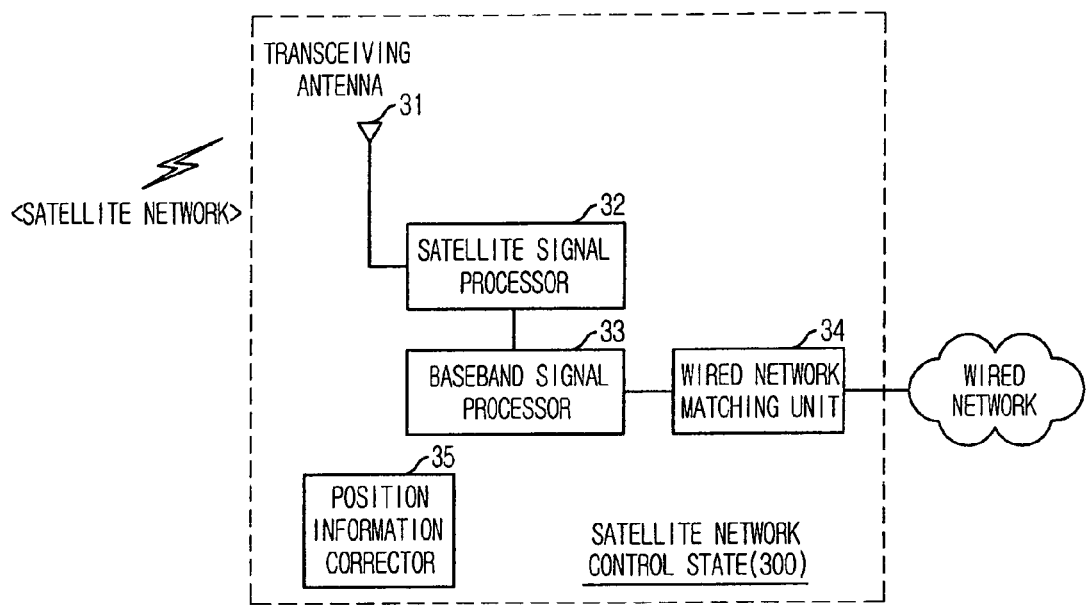
FIG. 4 is a block diagram illustrating a satellite network control station 300 shown in FIG. 1 in accordance with an embodiment of the present invention.

FIG. 4 is a block diagram illustrating a satellite network control station 300 shown in FIG. 1 in accordance with an embodiment of the present invention.

As described above with reference to FIG. 1, the satellite network control station 300 receives the vehicle position information upload instruction from the vehicle position information management center 400 and transmits the received vehicle position information upload instruction to the vehicle position information relay satellite 200. Also, the satellite network control station 300 receives the vehicle position information and vehicle ID from the vehicle position information relay satellite 200, and transmits the received vehicle position information and vehicle ID to the vehicle position information management center 400.

It is preferable that the satellite network control station 300 transmits position correction information for correcting a time and a path of a GPS signal, for example, a coordinate of a latitude and a longitude, to the vehicle position information transmitter 100 through the vehicle position information relay satellite 200. Then, the vehicle position information transmitter 100 corrects the error of the vehicle position information expressed as the obtained GPS signal, thereby providing further accurate vehicle position information to the vehicle position information management center 400.

In addition, the satellite network control station 300 exchanges various information with the vehicle position information relay satellite 200 through the satellite network, and exchanges various information with the vehicle position information management center 400 through a wired network such as a local area network (LAN), and a dedicated line.

In order to perform such an operation, the satellite network control station 300 includes transceiving antenna 31, a satellite signal processor 32, a baseband signal processor 33, a wired network matching unit 34, and a position information corrector 35. Hereinafter, the constitutional elements of the satellite network control station 300 will be described in detail. Additionally, it is obvious to those skilled in the art that the constitutional elements of the satellite network control station 300 can be modified, added or replaced with various satellite signal/wired network signal processing elements.

The satellite signal processor 32 processes a signal to be transmitted to the vehicle position information relay satellite 200 through the transceiving antenna 31, and processes a signal received from the vehicle position information relay satellite 200. The satellite signal processor 32 includes a function for removing a noise in a satellite signal, a signal encoder, a signal decoder, an amplifier, and a RF module.

The baseband signal processor 33 receives the processed satellite signal having vehicle position information and vehicle ID from the satellite signal processor 32, and transforms the received satellite signal to a data with a format proper to a wired network. Or, the baseband signal processor 33 receives a vehicle position information upload instruction from the wired network matching unit 35 and transforms the received vehicle position information upload instruction to a signal proper to a satellite network. The baseband signal processor 33 extracts vehicle position information and vehicle ID from a satellite signal received from the vehicle position information relay satellite 200, for example, a carrier wave.

The position information corrector 35 makes the position correction information for correcting a GPS signal to be transmitted to the vehicle position information transmitter 100 through the vehicle position information relay satellite 200 by cooperating with a GPS system. Or the position information corrector 35 corrects the vehicle position information received through the vehicle position information relay satellite 200, and transmits the corrected vehicle position information to the vehicle position information management center 400.

Figure 5:
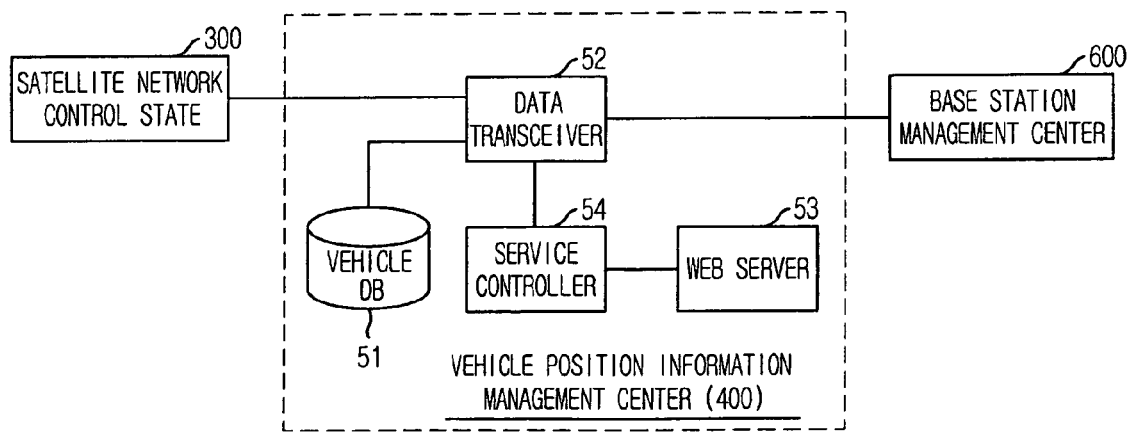
FIG. 5 is a block diagram illustrating a vehicle position information management center 400 shown in FIG. 1 in accordance with an embodiment of the present invention.

FIG. 5 is a block diagram illustrating a vehicle position information management center 400 shown in FIG. 1 in accordance with an embodiment of the present invention.

As described above with reference to FIG. 1, the vehicle position information management center 400 provides a vehicle position tracking service by tracking a current position and a traveling path of a target vehicle such as a stolen vehicle according to an owner's request based on vehicle position information received through the satellite network, particularly through the vehicle position information transmitter 100, the vehicle position information relay satellite 200, and the satellite network control station 300, or the terrestrial network particularly through the vehicle position information transmitter 100, the base station 500, and the base station management center 600.

In order to receive the vehicle position information obtained in the vehicle position information transmitter 100, it is preferable that the vehicle position information management center 400 requests the vehicle position information transmitter 100 to send the current vehicle position information.

That is, the vehicle position information management center 400 transmits a vehicle position information upload instruction to the transmitter through the satellite network and/or the terrestrial network. In response to the vehicle position information upload instruction, the vehicle position information transmitter 100 responses with the own position information. Especially, it is preferable that the vehicle position information management center 400 transmits the vehicle position information upload instruction through both of the satellite network and the terrestrial network in consideration of whether it is possible to communicate with the satellite network or the terrestrial network, and a time and place hiding the communication state thereof.

As shown in FIG. 5, the vehicle position information management center 400 includes a vehicle database (DB) 51, a data transceiver 52, a web server 53, and a service controller 54. In addition, it is obvious to those skilled in the art that the constitutional elements of the vehicle position information management center 400 can be modified, added or replaced with various elements related to vehicle position tracking service.

The vehicle DB 51 stores information about vehicle corresponding to a service subscriber, where the information includes, for example, a vehicle ID, a vehicle number, a vehicle registration number, a subscriber personal information, and an account information. Also, the vehicle position information received from the vehicle position information transmitter 100 through the satellite network and/or the terrestrial network is matched to a corresponding vehicle ID and stored in the vehicle DB 51.

The data transceiver 52 transmits and receives data to/from the satellite network control station 300, and the base station management center 600.

The web server 53 provides an interface, for example, a web page, to a user to use the vehicle tracking service, and receives a report of stolen vehicle through the provided web page.

The service controller 54 controls overall processes of the vehicle tracking service. When the stolen vehicle is reported from a subscriber through the web server 53, the service controller 54 transmits a vehicle position information upload instruction to the vehicle position information transmitter 100 installed in the subscriber's vehicle through the satellite network and/or the terrestrial network. Then, the service controller 54 informs the subscriber of the received vehicle position information and/or transmits the received vehicle position information to the related computer system in a police station.

Figure 6:
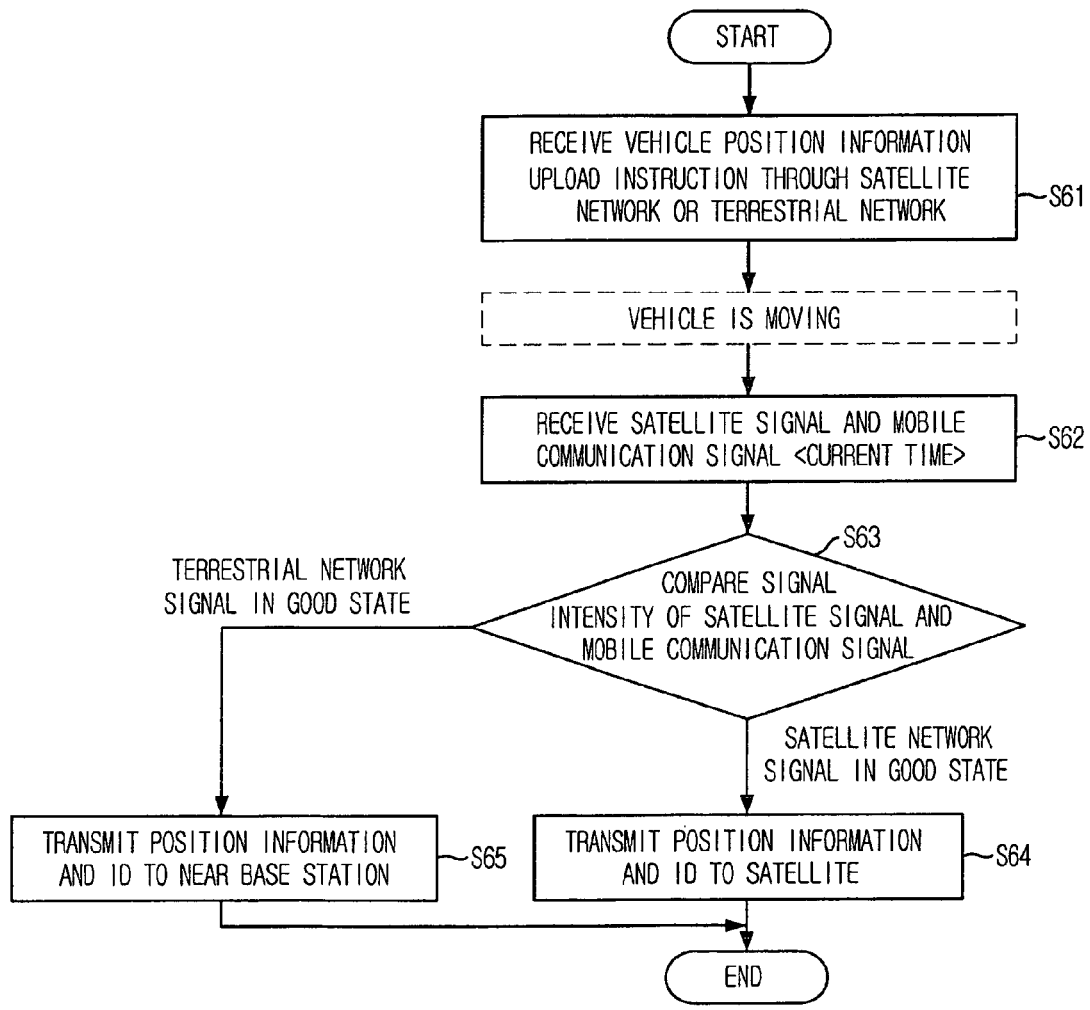
FIG. 6 is a flowchart illustrating a method of transmitting vehicle position information via satellites in accordance with an embodiment of the present invention.

FIG. 6 is a flowchart illustrating a method of transmitting vehicle position information via satellites in accordance with an embodiment of the present invention. The method shown in FIG. 6 is performed in the vehicle position information transmitter 100.

When the vehicle position information transmitter 100 receives a vehicle position information upload instruction through a satellite network, particularly through a vehicle position information management center 400, a satellite network control station 300, and a vehicle position information relay satellite 200, and through a terrestrial network, particularly through a vehicle position information management center 400, a base station management center 600, and a base station 500, the vehicle position information transmitter 100 starts a vehicle position information transmission process. That is, the vehicle position information transmitter 100 receives a satellite signal from the vehicle position information relay satellite 200 from the current time point and receives a mobile communication signal from the base station 500 at step S61 and S62. Meanwhile, the vehicle is continuously traveling.

As another example, the vehicle position information transmitter 100 may start the vehicle position information transmission process according to a previous setup although the vehicle position information transmitter 100 did not receive the vehicle position information upload instruction. That is, without the external instruction, the vehicle position information transmitter 100 may select one of the satellite network and the terrestrial network and regularly transmit the vehicle position information and vehicle ID to the vehicle position information management center 400 through the select network.

Then, the vehicle position information transmitter 100 compares the intensity of the satellite signal with that of the mobile communication signal at step S63. According to the location of the vehicle, the vehicle position information transmitter 100 may receive only one of the satellite signal and the mobile communication signal or both of them.

If the intensity of the satellite signal is greater than that of the mobile communication signal at step S63, the vehicle position information transmitter 100 determines that the satellite network has better state and selects the satellite network, thereby transmitting vehicle position information and vehicle ID to the vehicle position information relay satellite 200 at step S64. The vehicle position information and the vehicle ID transmitted from the vehicle position information transmitter 100 is transmitted to the vehicle position information management center 400 through the vehicle position information relay satellite 200 and the satellite network control station 300.

If the intensity of the mobile communication signal is greater than that of the satellite signal at step S63, the vehicle position information transmitter 100 determines that the mobile communication network has better state and selects the terrestrial network, thereby transmitting vehicle position information and vehicle ID to the base station 500 at step S65. The vehicle position information and the vehicle ID transmitted from the vehicle position information transmitter 100 is transmitted to the vehicle position information management center 400 through the base station 500 and the base station management center 600.

Figure 7:
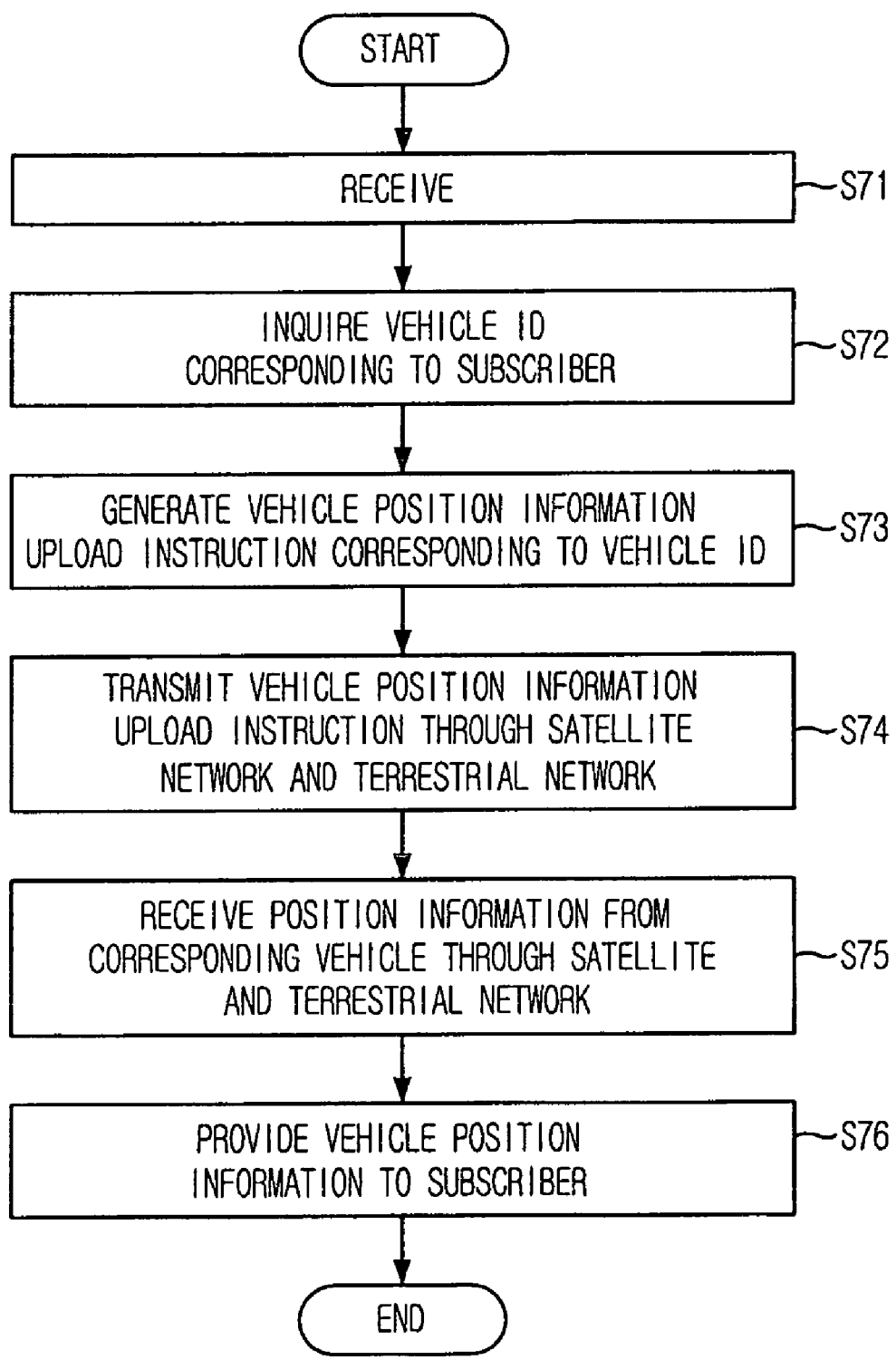
FIG. 7 is a flowchart illustrating a method for tracking a vehicle position via a satellite network in accordance with an embodiment of the present invention.

FIG. 7 is a flowchart illustrating a method for tracking a vehicle position via a satellite network in accordance with an embodiment of the present invention. The method shown in FIG. 7 is performed in a vehicle position information management center 400.

The vehicle position information management center 400 receives a report of vehicle stolen from a subscriber through a web server 53 at step S71. Then, the vehicle position information management center 400 inquiries a vehicle ID corresponding to the subscriber from the vehicle DB at step S72, and creates a vehicle position information update instruction corresponding to the inquired vehicle ID at step S73.

Afterward, in order to transmit the created vehicle position information upload instruction to the vehicle position information transmitter 100 installed to the stolen vehicle, the vehicle position information management center 400 transmits the created vehicle position information upload instruction through the satellite network and the terrestrial network at step S74. It is preferable that the vehicle position information management center 400 transmits the created vehicle position information upload instruction through both of the satellite network and the terrestrial network in consideration of whether it is possible to communicate with the satellite network or the terrestrial network, and a time and place hiding the communication state thereof.

Then, the vehicle position information management center 400 constantly receives vehicle position information and vehicle ID through the satellite network and/or the terrestrial network from the vehicle position information transmitter 100 installed at the stolen vehicle as a result of transmitting the vehicle position information upload instruction at step S75.

Afterward, the vehicle position information management center 400 tracks the current location and the traveling path of the stolen vehicle based on the position information received from the vehicle position information transmitter 100 installed at the stolen vehicle, and provides the information related to vehicle position tracking service to the subscriber or the related system of the policy station at step S76.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

According to the certain embodiment of the present invention, vehicle position information can be collect without interruption through a satellite network although a terrestrial network is malfunctioned, for example, mobile communication base stations posted near to a moving vehicle are malfunctioned, and a target vehicle can be accurately tracked based on the collected vehicle position information.

Also, the reliability of vehicle position information can be guaranteed because a vehicle position information upload instruction, vehicle position information and vehicle ID can be transmitted and received by cooperating with the terrestrial network and the satellite network although a vehicle is moving at any time and any place.

The present application contains subject matter related to Korean patent application Nos. 2005-0121169 and 2006-0052560, filed with the Korean patent office on Dec. 9, 2005, and Jun. 12, 2006, respectively, the entire contents of which being incorporated herein by reference.

While the present invention has been described with respect to certain preferred embodiments, it will be apparent to those skilled in the art that various changes and modifications may be made without departing from the spirits and scope of the invention as defined in the following claims.

What is claimed is:

1. A vehicle position information transmitter via a satellite comprising:
    a satellite network signal transceiver for transmitting and receiving a satellite signal to/from a vehicle position information relay satellite through a satellite network antenna;
    a terrestrial network signal transceiver for transmitting and receiving a mobile communication signal to/from a base station through a terrestrial network antenna;
    a receiving signal comparator for comparing an intensity of the received satellite signal with an intensity of the received mobile communication signal;
    a communication network determiner for determining a signal transmission network based on the result of comparison the signal intensities from the receiving signal comparator;
    a communication link setup unit for establishing a satellite network link through the satellite network signal transceiver or a terrestrial network link through the terrestrial network signal transceiver according to the determined communication network from the communication network determiner; and
    a transmission signal generator for generating a signal to transmit through the setup communication link at the communication link setup unit,
    wherein vehicle position information and vehicle ID are transmitted through the satellite network if a satellite network communication state is good as the result of comparing the signal intensities, or vehicle position information and vehicle ID are transmitted through the terrestrial network if a terrestrial network communication state is good as the result of comparing the signal intensities, in response to a vehicle position information upload instruction, to provide a vehicle position tracking service to a corresponding subscriber based on the vehicle position information and vehicle ID communicated from the vehicle position information transmitter through the satellite network and/or the terrestrial network.

2. The vehicle position information transmitter via a satellite as recited in claim 1, wherein when the vehicle position information transmitter receives a vehicle position information upload instruction through the satellite network signal transceiver, or when the vehicle position information transmitter receives a vehicle position information upload instruction through the terrestrial network through the terrestrial network signal transceiver, the vehicle position information transmitter transmits vehicle position information and vehicle ID through a predetermined communication network.

3. The vehicle position information transmitter via a satellite as recited in claim 1, wherein the vehicle position information transmitter regularly transmits vehicle position information and vehicle ID at a previously setup time period through a predetermined communication network.

4. The vehicle position information transmitter via a satellite as recited in claim 1, wherein the vehicle position information transmitter transmits vehicle position information and vehicle ID through a terrestrial network if a satellite communication state is equal to a terrestrial communication state as the result of comparing the intensities of the satellite network and the terrestrial network.

5. A method of transmitting vehicle position information via a satellite network comprising the steps of:

a) comparing an intensity of a satellite signal received from a vehicle position information relay satellite with an intensity of a mobile communication signal received from a near base station when receiving a vehicle position information upload instruction through a satellite network or a terrestrial network, or at a pre-set time period; and b) transmitting vehicle position information and vehicle ID to the vehicle position information relay satellite if the intensity of the satellite signal is greater than the intensity of the mobile communication signal, and transmitting vehicle position information and vehicle ID to the near base station if the intensity of the mobile communication signal is greater than the intensity of the satellite signal, to provide a vehicle position tracking service to a corresponding subscriber based on the vehicle position information and the vehicle ID communicated through the relay satellite and/or the near base station.

6. A vehicle position tracking system comprising:

a vehicle position information management center for transmitting a vehicle position information upload instruction to a vehicle position information transmitter through a satellite network and a terrestrial network, and providing a vehicle position tracking service to a corresponding subscriber based on vehicle position information and vehicle ID received from a vehicle position information transmitter through a satellite network and/or a terrestrial network;

a mobile communication system of a terrestrial network for transmitting and receiving signals between the vehicle position information management center and the vehicle position information transmitter;

a vehicle position information relay satellite of a satellite network for transmitting and receiving signals between the vehicle position information management center and the vehicle position information transmitter;

a satellite network control station for transmitting and receiving a signal between the vehicle position information relay satellite and the vehicle position information management center; and a vehicle position information transmitter for transmitting vehicle position information and vehicle ID to the vehicle position information management center through the vehicle position information relay satellite if a satellite network communication state is good as the result of comparing a satellite signal intensity with a mobile communication signal intensity, or transmitting vehicle position information and vehicle ID to the vehicle position information management center through the terrestrial network if a terrestrial network communication state is good as the result of comparing a satellite signal intensity with a mobile communication signal intensity.

7. The vehicle position tracking system as recited in claim 6, wherein the satellite network control station provides position correcting information obtained through cooperating with a global positioning system GPS to the vehicle position information transmitter through the vehicle position information relay satellite, or corrects vehicle position information received from the vehicle position information transmitter through the vehicle position information relay satellite by cooperating with a GPS and provides the corrected vehicle position information to a vehicle position information management center.

8. A method of tracking a vehicle position comprising the steps of:

a) inquiring vehicle information corresponding to a subscriber if a request of tracking a vehicle position from a subscriber is received through a predetermined terminal in response to a vehicle position information upload instruction to provide a vehicle position tracking service to the corresponding subscriber through a satellite network and/or terrestrial network;

b) creating a vehicle position information upload instruction to transmit to the inquired vehicle;

c) transmitting the created vehicle position information upload instruction to the inquired vehicle through a satellite network and a terrestrial network;

d) receiving vehicle position information and vehicle ID from a corresponding vehicle position information transmitter through a satellite network and/or a terrestrial network as a result of transmitting the vehicle position information upload instruction; and e) providing vehicle position tracking information to the subscriber based on the received vehicle position information to provide a vehicle position tracking service to the corresponding subscriber through a satellite network and/or a terrestrial network.

* * * * *